United States Patent [19]

Brilando

[11] 3,713,350
[45] Jan. 30, 1973

[54] AIR CUSHION HANDLEBAR GRIP
[75] Inventor: Frank P. Brilando, Niles, Ill.
[73] Assignee: Schwinn Bicycle Company, Chicago, Ill.
[22] Filed: May 17, 1971
[21] Appl. No.: 143,767

[52] U.S. Cl. ............................................74/551.9
[51] Int. Cl. .............................................B62k 21/26
[58] Field of Search............74/551.9, 551.8, 551.1

[56] References Cited

UNITED STATES PATENTS

| 2,618,986 | 11/1952 | Hungerford | 74/551.9 |
|---|---|---|---|
| 1,290,716 | 1/1919 | Cline | 74/551.9 |
| 593,162 | 11/1897 | Miller | 74/551.9 |
| 599,131 | 2/1898 | King | 74/551.9 |
| D185,613 | 6/1959 | Price | 74/551.9 X |

FOREIGN PATENTS OR APPLICATIONS

| 870,862 | 3/1942 | France | 74/551.9 |

Primary Examiner—Milton Kaufman
Assistant Examiner—F. D. Shoemaker
Attorney—Davis, Lucas, Brewer & Brugman

[57] ABSTRACT

Air cushion handlebar grip slidable onto handlebar and having lower portion with finger-receiving scallops, side portions with peripherally spaced and longitudinally extending grooves, and upper portion opposite finger-receiving scallops with a longitudinally extending air-containing cavity therein to absorb shocks and prevent pinching of nerves in palmar aspect of hand.

2 Claims, 6 Drawing Figures

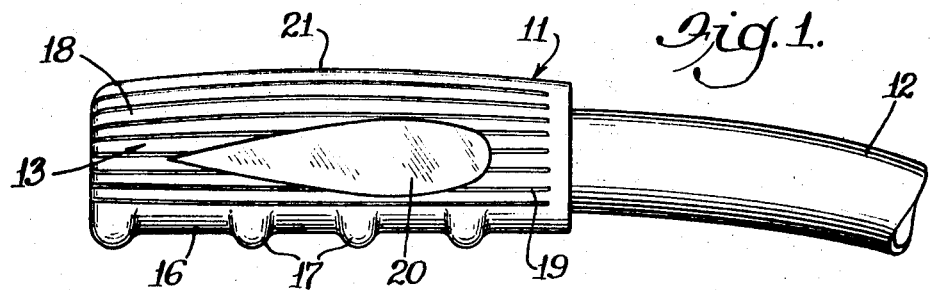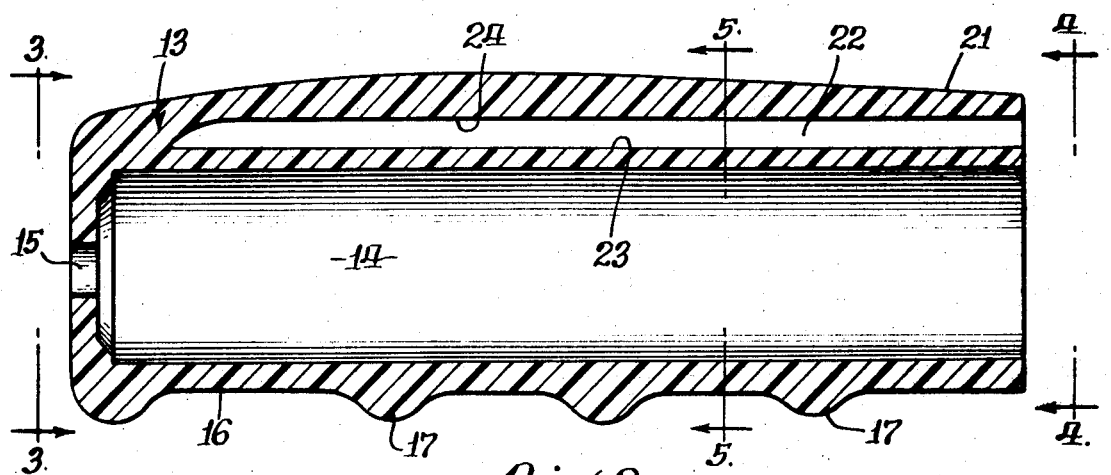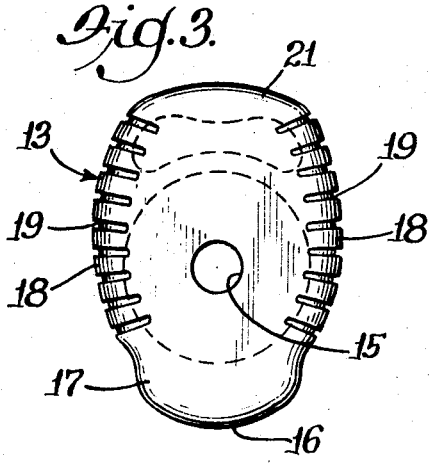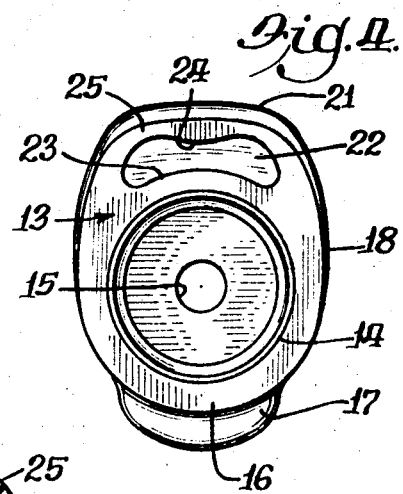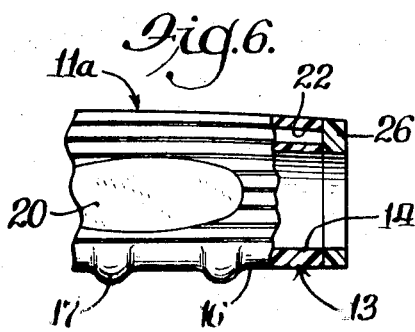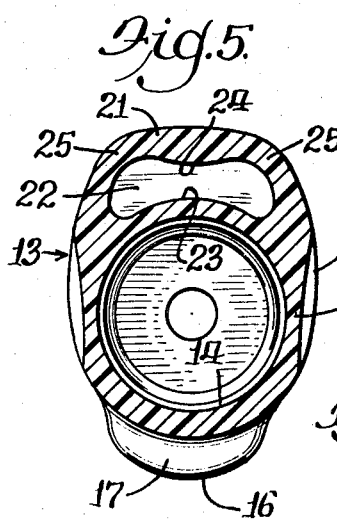

AIR CUSHION HANDLEBAR GRIP

BACKGROUND OF THE INVENTION

1. Field of the Invention.

This invention relates generally to handlebar grips, such as those for bicycles, motorcycles, exercise devices, and the like.

2. Description of the Prior Art.

The closest known handlebar grip comprises a tubular bore slidable onto a handlebar and having a lower portion with finger-receiving scallops spaced longitudinally along the lower outer surface and peripherally spaced grooves extending longitudinally in the other portions of its outer surface. Although such grips are made of a suitable vinyl plastic to make them long wearing, they are relatively inelastic and transmit shocks to the hands from the handlebar, frequently resulting in pinching of the nerves of the hand, particularly at the outer ends of the first three metacarpals, that is, those of the ball of the thumb and the base of the index and adjacent fingers. These are the median and ulnar nerves of the brachial plexus, the ball of the thumb being supplied by the median nerve and the ulnar nerve supplying the inner digit and a half on the palmar aspect.

SUMMARY OF THE INVENTION

This invention eliminates these disadvantages of such prior grips, while employing the same desirable long wearing vinyl plastic, finger-receiving scallops and peripherally spaced grooves on the side surfaces, by providing an upper portion of the grip opposite the finger-receiving scallops with an air-containing cavity extending longitudinally thereof to cushion and absorb shocks and prevent pinching of the nerves in the palmar aspect of a hand gripping the same with the fingers engaging the scallops. In this connection, it is preferred that the air-containing cavity be shaped in transverse section to present an outer wall of varying thicknesses, with the thinnest portions extending longitudinally adjacent the lateral edges of the cavity to provide maximum cushioning at the most vulnerable locations in the clenched hand, i.e., the ball of the thumb at one side and the outer ends of the metacarpals of the index and middle fingers at the other side of the cavity.

In the preferred embodiment, the air-containing cavity is closed at the outer end of the grip and open at the inner end to the atmosphere. Another illustrated embodiment increases the resistance of the cushion by employing closure means for the open end of the cavity in the form of a ring secured to the inner end of the grip.

In the Drawings:

FIG. 1 is an elevational view of a handlebar grip embodying the features of the invention mounted on the end portion of a handlebar;

FIG. 2 is a vertical section taken longitudinally through the handlebar grip of FIG. 1;

FIG. 3 is an end elevation of the grip as seen from the left end of FIG. 2 substantially along the lines 3—3;

FIG. 4 is an end elevation a seen substantially along the lines 4—4 of FIG. 2;

FIG. 5 is a transverse section through the grip as seen along the lines 5—5 of FIG. 2; and FIG. 6 is an elevational view of a modified form of grip with the inner end portion thereof shown in vertical section.

DESCRIPTION OF THE PREFERRED EMBODIMENTS

Referring more particularly to FIG. 1, reference numeral 11 indicates in general a handlebar grip embodying the features of the invention slidably mounted upon the outer end of handlebar 12 in well-known manner. The grip 11 comprises a tubular body, indicated generally by reference numeral 13, having a central and longitudinally extending bore 14 (FIG. 2) for slidably engaging the outer end of the handlebar 12. The outer end of the tubular body 13 is provided with a reduced opening 15 in the usual manner to facilitate the slidable mounting of the grip on a handlebar.

The tubular body 13 is made up of a lower portion 16 having a plurality of finger-receiving scallops 17 spaced longitudinally along its outer surface, and side portions 18. As best seen in FIGS. 1 and 3, these side portions 18 are provided with a plurality of peripherally spaced grooves 19 extending longitudinally along their outer surfaces, and each of the side portions 18 also may have a decorative raised or depressed portion 20, as seen in FIGS. 1 and 5.

The tubular body 13 of the grip 11 also includes an upper portion 21 disposed diametrically opposite the finger-receiving scallops 17 of the lower portion 16 which is provided with an air-containing cavity or recess 22 extending longitudinally of the grip and disposed interiorly thereof. As best seen in FIGS. 2 and 4, the inner end of the cavity 22 is open. This air-containing cavity or recess 22 is defined by a bottom surface 23 which, as best seen in FIG. 5, is substantially concentric with the bore 14, and a top surface 24 centrally depressed longitudinally of the grip (FIGS. 4 and 5) to present an outer or upper wall of the upper portion 21 of varying thicknesses with the thinnest outer wall portions at 25 along the longitudinally extending front and rear or lateral ends of the recess 22. These relatively thin outer wall portions 25 thus are located so as to provide maximum cushioning at the most vulnerable locations for a clenched hand which engages the grip 11 with the fingers disposed in the scallops 17, such most vulnerable locations comprising the ball of the thumb at one side and the outer ends of the metacarpals of the index and middle fingers at the other side.

In FIG. 6 is illustrated a grip 11a as another embodiment of the invention in which the resistance of the cushion effected by the cavity-containing upper portion 21 is increased by employing closure means for the open end of the cavity 22, this modified grip otherwise being the same as grip 11 of FIGS. 1–5. As illustrated in FIG. 6, such closure means is in the form of a ring 26 having an inner diameter substantially the same as the diameter of the bore 14 and secured to the inner end of the body 13 to close the inner end of the longitudinally extending recess 22.

It will be appreciated that any other suitable means may be employed to seal the inner end of the air-containing cavity 22 instead of the ring 26 when it is desired to increase the resistance of the cushioned upper portion 21. And it will be apparent that the instant handlebar grip may be made from any suitable material other than the vinyl plastic previously noted, such materials that are readily available being well known by those skilled in the art.

It is thought that the invention and many of the attendant advantages will be understood from the foregoing description, and it will be apparent that various changes may be made in the form, construction, and arrangement of the parts without departing from the spirit and scope of the invention or sacrificing all of its material advantages, the forms hereinbefore described being merely preferred embodiments thereof.

I claim:

1. An air cushion handlebar grip, comprising a tubular body having a bore for sliding engagement onto a handlebar, said body comprising a lower portion with finger-receiving scallops spaced longitudinally along the outer surface, side portions with peripherally spaced grooves extending longitudinally in their outer surfaces, and an upper portion diametrically opposite said finger-receiving scallops having an air-containing cavity extending longitudinally and disposed interiorly thereof, wherein said longitudinally extending cavity is defined by a bottom surface substantially concentric with said bore, and a top surface spaced from said bottom surface and centrally depressed along its longitudinal center portion.

2. An air cushion handlebar grip according to claim 1, wherein said air-containing cavity is shaped in transverse section to present an outer wall of varying thicknesses with the thinnest portions thereof extending longitudinally adjacent the lateral edges of said cavity.

* * * * *